Jan. 15, 1963

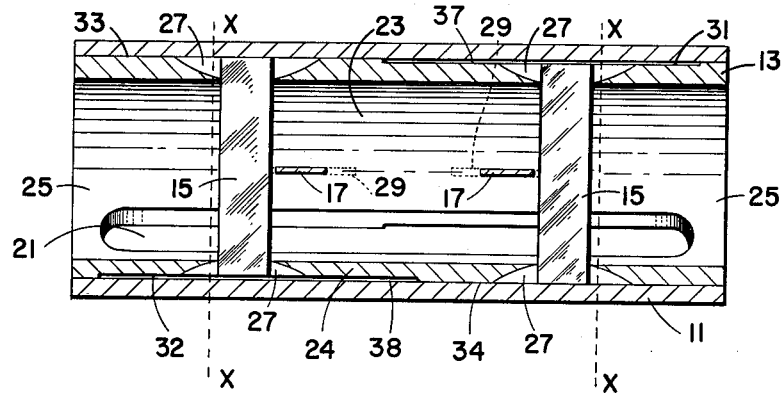
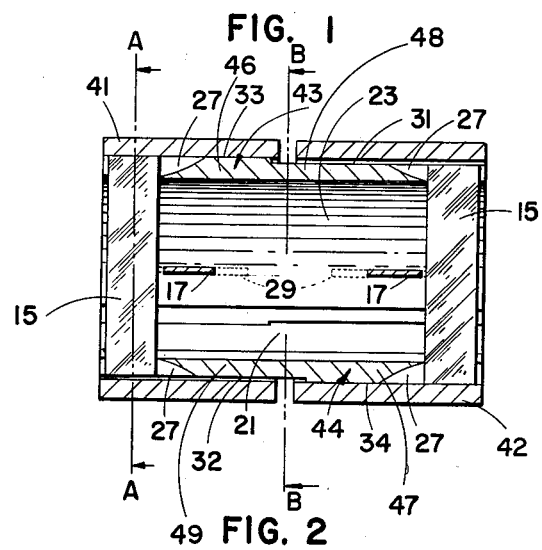
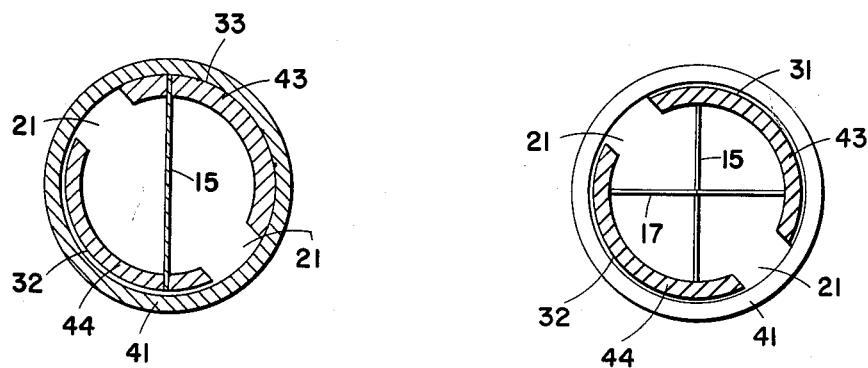

H. TROEGER 3,073,584

FLEXURAL PIVOT DEVICE

Filed Feb. 26, 1960

*INVENTOR.*
HENRY TROEGER

BY

Robert W. Ely

ATTORNEY

United States Patent Office 3,073,584
Patented Jan. 15, 1963

3,073,584
FLEXURAL PIVOT DEVICE
Henry Troeger, Cooperstown, N.Y., assignor to The Bendix Corporation, a corporation of Delaware
Filed Feb. 26, 1960, Ser. No. 11,290
11 Claims. (Cl. 267—1)

This invention relates to devices for supporting a mechanism which is to be limitedly rotated about an axis and more particularly concerns improvement in flexural pivot devices which provide limited relative rotation between two parts by flexing crossed flat springs connecting the two parts. An object of the present invention is to provide an improved flexural pivot device which is simply constructed, has few parts, and can be made in small sizes and which retains the advantages of no backlash and no friction or wear with resulting limitations due to lubrication at high temperature.

A further object is the provision of an improved flexural pivot device which has axially-aligned tubular members connected by structure including crossed pairs of flat springs whereby the device can be simply mounted in support structure and can provide a sensitive pivotal mounting.

Another object is to provide a simplified method of more economically manufacturing flexural pivot devices wherein two sleeves and flat springs are assembled, bonded as a unit and then cut to form a flexural pivot construction whereby extensive machining of parts and assembly of many parts is avoided.

An additional object is the provision of an improved flexural pivot device having arcuate elements which, by abutment of axial edges, limit the angular movement due to flexure of the springs.

The realization of the above objects along with the features and advantages of the invention will be apparent from the following description and the accompanying drawing in which:

FIG. 1 is a longitudinal cross-sectional view of an assembly of inner and outer sleeves and crossed flat springs and shows features which provide an improved method of manufacturing whereby, after bonding, the inner sleeve can be cut to provide two axially-extending arcuate elements and the outer sleeve can be cut to provide two tubular members;

FIG. 2 is a longitudinal cross-sectional view of a cantilever-type flexural pivot device embodying the present invention and shows the device which results from the FIG. 1 assembly so that two outer tubular members can be relatively rotated due to connecting structure which includes crossed pairs of flat springs and two arcuate elements;

FIG. 3 is a transverse cross-sectional view along the line A—A of FIG. 2;

FIG. 4 is a transverse cross-sectional view along the line B—B of FIG. 2;

Figure 6:
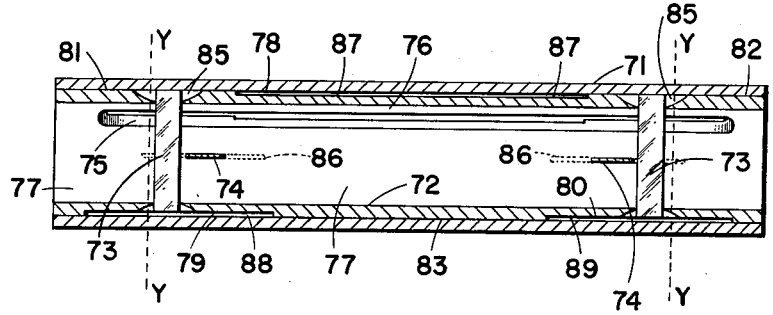
Figure 7:
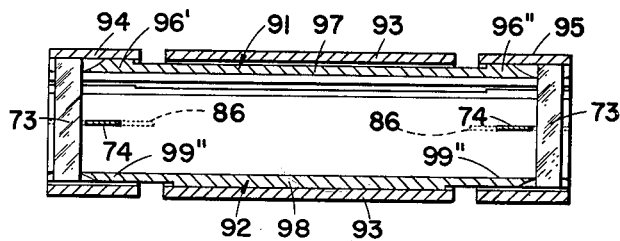
Figure 5:
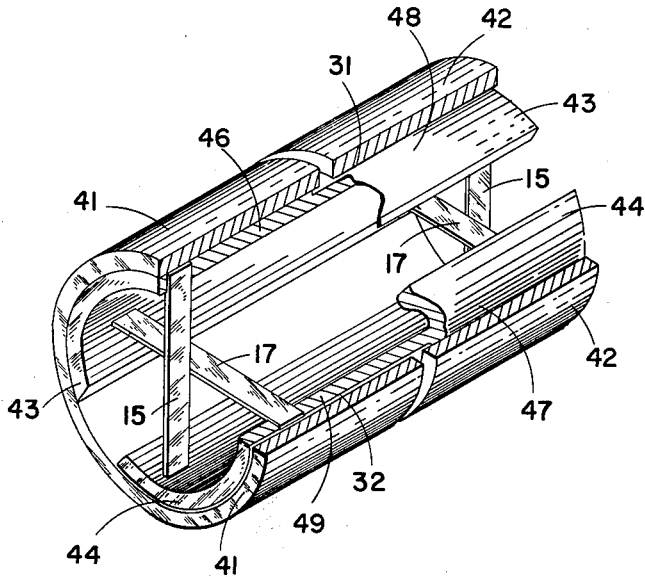
FIG. 5 is a broken-away isometric view of a cantilever-type flexural pivot device and shows the internal construction connecting the two axially-aligned tubular members whereby limited relative rotation can be made with flexure of the springs.

FIG. 6 is a longitudinal cross-sectional view of an assembly for a double-end-support flexural pivot and shows three reduced diameters on the ribs of the inner sleeve whereby a center tubular member and two end tubular members can be formed in the method of the present invention and FIG. 7 is a longitudinal cross-sectional view of the double-end-support flexural pivot device embodying the invention and shows the device obtained from the FIG. 6 assembly.

Referring to FIG. 1, it can be seen that an assembly comprised of an outer tubular sleeve 11, an inner tubular sleeve 13, and two pairs of crossed flat steel springs 15 and 17 is formed which can be conveniently inserted in a furnace for bonding the springs to the inner sleeve 13 and inner sleeve 13 to outer sleeve 11 at contact surfaces. The inner sleeve 13 is formed with two axially-extending openings 21 (one appearing in FIG. 1) at diametrical locations so that two axially-extending ribs 23 and 24 remain between the openings 21. It is to be noted that, when the ends 25 of the outer and inner sleeves 11 and 13 are removed (axially-outwardly of outer springs 15 and through openings 21) the inner sleeve 13 becomes two arcuate elements as will be described. The ribs 23 and 24 of the inner sleeve 13 are slotted or formed at each end with two facing axially-spaced pairs of opposed radial slots 27 and 29 for flat springs 15 and 17 with slots 27 being in the vertical plane and slots 29 in the horizontal plane. Slots 27 are thus in a first axial plane which is perpendicular to a second axial plane passing through slots 29.

The inner sleeve 13 is also formed or machined so that each half of the ribs 23 and 24 at diagonally-opposite locations has reduced-diameter outer surfaces 31 and 32. It is to be noted surfaces 31 and 32 overhang each other at the center so that outer sleeve 11 can be cut into two tubular members. The remaining outer surfaces 33 and 34 respectively at the left and right, of course, have the original diameter of the sleeve 13 and serve as mounting-bonding surfaces.

Surfaces 33 and 34 and the facing inner surface of the outer sleeve 11 are thinly coated with a suitable bonding material or agent. Springs 15 and 17 are also thinly-coated so that the end parts thereof can be rigidly bonded to the sides of the slots 27 and 29. The bonding material will, of course, vary with the material from which the sleeves 11, 13 and springs 15, 17 are made. For example, with brass or bronze sleeves a suitable low-melting solder is applied as a thin coating. With steel sleeves, suitable lower-melting metals are thinly electroplated on the contact or bonding surfaces or these surfaces are thinly-coated with a suitable brazing material. The bonding in some cases can also be effected by using epoxy resin cement. Depending on the temperature at which bonding is effected, certain steel springs or sleeves are heat treated as required during and after bonding. Since the flexural pivot device of the present invention can be made in sizes from about one-eighth of an inch in diameter for instruments to about three inches in diameter for flight control surface elements, it is apparent that the size, the loading, the temperature conditions and other factors will govern the selection of the bonding agent and the material for the sleeves of springs.

To provide the FIG. 1 assembly, springs 15 and 17 are inserted or positioned in slots 27 and 29 in the ribs of inner sleeve 13 to provide crossed springs with the ends of the springs respectively within the peripheries of the outer surfaces 33 and 34 and reduced-diameter surfaces 31 and 32. In the event the fit of springs 15 and 17 does not provide this positioning, the springs can have a corner bent or can be staked at reduced-diameter surfaces 31 and 32 so that the springs do not extend beyond these surfaces. The outer sleeve 11 is positioned on the mounting surfaces 33 and 34 of the inner sleeve 13 with ends of the sleeves in the same plane so that openings 21 are covered and thus forms the FIG. 1 assembly for bonding. This bondable assembly is then inserted in a suitable furnace and heated to effect bonding of the springs 15, 17 to the inner sleeve 13 and the outer sleeve 11 to the mounting surfaces 33, 34 of the inner sleeve 13. It is to be noted that centrally-overhanging recesses 37 and 38 are formed where reduced-diameter surfaces 31 and 32 overlap.

After bonding so that the inner sleeve 13 is integrally attached to the outer sleeve 11 at mounting-bonding surfaces 33 and 34 and so that the springs 15 and 17 are rigidly attached in slots 27 and 29, the ends of the inner and outer sleeves 11 and 13 are removed or cut-off in the vertical planes of the dashed lines X—X which are adjacent the edges of the outermost springs 15 and which extend through the axially outer parts of openings 21 or inwardly of the ends thereof. This operation results in two arcuate inner sleeve elements being formed from ribs 23 and 24 which are attached respectively to the two ends of the outer sleeve 11. Finally the outer sleeve 11 is severed or cut into two outer tubular members by cutting at the midpoint to the depth of the centrally overhanging recesses 37 and 38 formed by inner ends of reduced-diameter surfaces 31 and 32 and outer sleeve 11. The resulting unitized flexural pivot device is shown in FIGS. 2–5.

In FIGS. 2–5, it can be seen that, after the above-described manufacturing steps, there are two outer sleeve means or tubular members 41 and 42 and two arcuate inner elements 43 and 44. The axially-aligned outer members 41 and 42 are axially-spaced and separated at the peripheral opening formed by the midpoint cutting operation while the inner arcuate elements 43 and 44 result from the cutting at both ends through openings 21. The left tubular member 41 is bonded to mounting surface 33 of the upper arcuate element 43. The right tubular member 42 is likewise bonded to the mounting surface 34 of the lower arcuate element 44. The effective angle included between the adjacent edges of the arcuate elements 43 and 44 is thirty degrees and this angle can have a range of fifteen to forty-five degrees. The adjacent axially-extending edges of elements 43 and 44 provide stop means to limit safely the flexing of springs and to limit the relative rotation of members 41 and 42. It is to be noted that arcuate elements 43 and 44 respectively include mounting-surface sections 46 and 47 and axially-extending reduced-diameter sections 48 and 49 which project into left and right tubular members 42 and 41 and are radially-spaced therefrom. Springs 15 and 17 are firmly bonded in slots 27 and 29 of the arcuate elements 43 and 44 so that attachment is maintained under adverse flexing conditions and further so that relative axial movement or tilting between the left and right tubular members 41 and 42 is prevented. Crossed springs 15 and 17 at each end provide a rotational axis adjacent to the intersections of the springs. The two identical constructions provided by tubular member 41 with arcuate element 43 and tubular member 42 with arcuate element 44 can be referred to as two cylindrical means each having inwardly-projecting arcuate structures which have finger-like means extending axially. For the left cylindrical means (member 41 and element 43) the arcuate structure consists of mounting-surface section 46 and reduced-diameter section 48 which form the finger-like means extending axially into and radially-spaced from the right cylindrical means (member 42 and element 44). For the right cylindrical means, the arcuate structure is formed by mounting-surface section 47 and the reduced-diameter section 49 which forms the finger-like means extending axially into and radially-spaced from the left cylindrical means. With this terminology, the facing parts of arcuate structures are connected by springs 15 and 17 whereby relative rotation between the two cylindrical means on a common axis can be effected. The arcuate structures limit this rotation. The finger-like sections 48 and 49 are spaced radially sufficiently so that contact is prevented during relative rotation of members 41 and 42 when the springs 15 and 17 are flexed.

The operation of the FIGS. 2–5 flexural pivot device as a pivotal mounting is believed to be apparent from the foregoing description. Thus, with reference to FIG. 5 an instrument indicator, one end of a butterfly valve, a turbine engine control vane, one end of flight vehicle control surface or many other devices which are usually mounted in bearings and have limited rotation or pivoting is mounted on the left tubular member 41 and the right tubular member 42 is mounted in a hole in support structure and fixed by a set pin or other conventional arrangement. When the instrument indicator, for example, is actuated in a clockwise direction, the left tubular member 41 is rotated clockwise from normal position with the flexing of the springs 15 and 17 as is well known in flexural pivot devices. The radial-spacing between the axially-extending finger-like sections 48 and 49 and the facing tubular members 42 and 41 provides clearance upon the flexing or bending of the springs 15 and 17. Rotation can be made in either direction as limited by the abutment of the axially-extending edges of the arcuate elements 43 and 44. It is to be noted that the present easily-replaceable flexural pivot is made from a relatively few parts (which are connected by a simple bonding step) and is more compact for a given capacity than constructions which have springs connected by screws to non-tubular mounting means. Further, stop or limit means are provided in the compact unitized construction of the present invention which permits also economical use in small-size applications.

Referring to FIGS. 6 and 7, it is apparent that, by a similar fabricating method, a double-end-supported flexural pivot is provided. Thus, outer sleeve 71, inner sleeve 72 and two pairs of crossed springs 73 and 74 form an assembly (see FIG. 6) which can be conveniently bonded in a furnace when coated with a bonding material as above-described. Inner sleeve 72 is formed with two axially-extending openings 75 (one appearing) at diametrical locations to provide ribs 76 and 77 between the openings 75. Inner sleeve 72 also is formed with a central reduced-diameter surface 78 in rib 76 and, diagonally-opposite, two reduced-diameter outer surfaces 79 and 80 in each end part of rib 77 which results in mounting surfaces 81, 82 and 83. As with the cantilever-type pivot, strip springs 73 and 74 are mounted in slots 85 and 86 to provide crossed flat springs in perpendicular radial planes. Positioning the outer sleeve 71 on the inner sleeve 72 provides the assembly (shown in FIG. 6) which has over-hanging recesses 87, 88 and 89. After bonding as above described, the ends of outer sleeve 71 and inner sleeve 72 are severed through openings 75 along lines Y—Y to provide two arcuate elements 91 and 92 (see FIG. 7) and the outer sleeve wall is cut through at the outer ends of recess 87 and the inner ends of recesses 88 and 89 to provide a center tubular member 93 and two end tubular members 94 and 95, as shown in FIG. 7. Arcuate element 91 is bonded to the two outer end members 94 and 95 and arcuate element 92 is bonded to center member 93 while the pairs of springs 73 and 74 connect the arcuate elements at axially-spaced locations. The transverse cross sections (if rotated ninety degrees) would be the essentially same as shown for the above-described embodiment except that the effective included arc angle between the adjacent edges of the arcuate elements 91 and 92 is fifteen degrees. As mentioned above, this angle can be within the range of fifteen to forty-five degrees. It is to be noted that end members 94 and 95 and center member 93 constitute with elements 91 and 92 (after the bonding) two cylindrical means having inwardly-projecting, diametrically-located arcuate structures which have finger-like means extending axially. For the cylindrical means formed by end members 94 and 95 and element 91, the arcuate structure consists of the mounting-surface sections 96' and 96" and the reduced-diameter section 97 which forms the finger-like means extending axially into and radially-spaced from the center cylindrical means. In relation to the center cylindrical means (member 93 and element 92), the arcuate structure is formed by mounting-surface section 98 and the reduced-diameter sections 99' and 99" which form the finger-like means extending axially into and radially-spaced from the end cylindrical means. As thus described, the opposed or facing arcuate structures are connected by flat springs so that the cylindrical means can be rotated relative to each other and the arcuate structures provide for limited relative rotation of the axially-spaced cylindrical means arranged on a common axis. The radial-spacing of the finger-like means is such that clearance is provided to prevent contact when the cylindrical means are rotated.

The operation of the flexural pivot device of FIG. 7 is basically as above-described except that support is provided at each end by anchoring both tubular end members 94 and 95. Thus, a device mounted on the center tubular member 93 can be rotated a limited extent and will be double-end supported by the fixed end members 94 and 95. Such rotaaion is effected by flexing springs 73 and 74 and can be made in either direction as limited by the side abutment of the arcuate elements 91 and 92.

It is to be understood that changes can be made in the disclosed embodiments and methods by persons skilled in the art without departing from the invention as set forth in the appended claims.

What is claimed is:

1. A flexural pivot device comprised of first and second arcuate inner sleeve elements arranged on a common circle with axially-extending edges equally spaced from each other, first and second outer tubular sleeve means arranged in axial alignment around said inner sleeve elements, said first inner sleeve element and said first outer sleeve means being bonded together, said second inner sleeve element and said second outer sleeve means being bonded together, said first inner sleeve element being radially spaced from said second outer sleeve means, said second inner sleeve element being radially spaced from said first outer sleeve means, said first and second inner sleeve elements having facing radial slots at each end located to form pairs of axially-spaced slots, said pairs of slots being further arranged so that axial planes through said pairs of slots have equal included angles, and flat springs mounted in each pair of facing slots; whereby said first outer sleeve means can be fixed and said second outer sleeve means can be rotated by flexing said springs.

2. A flexural pivot device comprised of first and second arcuate inner sleeve elements arranged on a common circle with axially-extending edges equally spaced from each other, first and second outer tubular sleeve means arranged in axial alignment around said inner sleeve elements, said first inner sleeve element and said first outer sleeve means being bonded together, said second inner sleeve element and said second outer sleeve means being bonded together, said first inner sleeve element being radially spaced from said second outer sleeve means, said second inner sleeve element being radially spaced from said first outer sleeve means, said first and second inner sleeve elements having two pair of facing radial slots axially-spaced at each end, said pairs of slots being further arranged so that the axial planes through said pairs of slots are perpendicular, flat springs bonded in each pair of facing slots, whereby said first outer sleeve means can be fixed and said second outer sleeve means can be rotated by flexing said springs, the adjacent axial edges of said first and second inner sleeve elements being so spaced as to be in abutment after limited rotation, said first and second outer sleeve means each being a tubular member whereby a cantilever-type flexure pivot device is provided.

3. A flexural pivot device comprised of first and second arcuate inner sleeve elements arranged on a common circle with axially-extending edges equally spaced from each other, first and second outer tubular sleeve means arranged in axial alignment around said inner sleeve elements, said first inner sleeve element and said first outer sleeve means being bonded together, said second inner sleeve element and said second outer sleeve means being bonded together, said first inner sleeve element being radially spaced from said second outer sleeve means, said second inner sleeve element being radially spaced from said first outer sleeve means, said first and second inner sleeve elements having two pair of facing radial slots axially-spaced at each end, said pairs of slots being further arranged so that the axial planes through adjacent pairs of slots are perpendicular, flat springs bonded in each pair of facing slots whereby said first outer sleeve means can be fixed and said second outer sleeve means can be rotated by flexing said springs, the adjacent axial edges of said first and second inner sleeve elements being so spaced as to be in abutment after limited rotation, said first outer sleeve means being two tubular members at each side of said second outer sleeve means whereby a flexure pivot device which can be supported at both ends is provided.

4. A flexural pivot device comprised of first and second arcuate inner sleeve elements arranged on a common circle with axially-extending edges equally spaced from each other, first and second outer tubular members arranged in axial alignment around said inner sleeve elements, said first inner sleeve element and said first outer tubular member being bonded together, said second inner sleeve element and said second outer tubular member being bonded together, said first inner sleeve element being radially spaced from said second outer tubular member, said second inner sleeve element being radially spaced from said first outer tubular member, said first and second inner sleeve elements having two pair of facing radial slots axially-spaced and diametrically-located at each end, and flat springs bonded in each pair of facing slots.

5. A flexural pivot device comprised of first and second cylindrical means arranged on a common axis and axially spaced from each other, said first cylindrical means having inwardly thereof arcuate structure, said arcuate structure extending axially into said second cylindrical means and being radially-spaced therefrom, said second cylindrical means having inwardly thereof arcuate structure diametrical of said arcuate structure of said first cylindrical means, said arcuate structure of said second cylindrical means extending axially into said first cylindrical means and being radially-spaced therefrom, crossed flat spring means connecting said arcuate structures so that said first and second cylindrical means are rotatable relative to each other on said common axis, said arcuate structures being so constructed as to limit the relative rotation between said cylindrical means.

6. A cantilever-type flexural pivot device comprised of first and second cylindrical means arranged on a common axis and axially spaced from each other, said first cylindrical means having inwardly thereof arcuate structure, said arcuate structure extending axially into said second cylindrical means and being radially-spaced therefrom, said second cylindrical means having inwardly thereof arcuate structure diametrical of said arcuate structure of said first cylindrical means, said arcuate structure of said second cylindrical means extending axially into said first cylindrical means and being radially-spaced therefrom, crossed flat spring means connecting said arcuate structures so that said first and second cylindrical means are rotatable relative to each other on said common axis, said arcuate structures being so constructed as to limit the relative rotation between said cylindrical means, said first cylindrical means including a first tubular member adapted to provide a fixed end support, said second cylindrical means including a second tubular member adapted to provide a rotatable mounting.

7. A double-end support flexural pivot device comprised of first and second cylindrical means arranged on a common axis and axially spaced from each other, said first cylindrical means having inwardly thereof arcuate structure, said arcuate structure extending axially into said second cylindrical means and being radially-spaced therefrom, said second cylindrical means having inwardly thereof arcuate structure diametrical of said arcuate structure of said first cylindrical means, said arcuate structure of said second cylindrical means extending axially into said first cylindrical means and being radially-spaced therefrom, crossed flat spring means connecting said arcuate structures so that said first and second cylindrical means are rotatable relative to each other on said common axis, said arcuate structures being so constructed as to limit the relative rotation between said cylindrical means, said first cylindrical means including two end tubular members adapted to provide fixed end support, said arcuate structure of said first cylindrical means connecting said two end tubular members, said second cylindrical means including a center tubular member positioned between said two end tubular members and adapted to be a rotatable mounting, said arcuate structure of said second cylindrical tubular member being a first section extending beyond one end of said center tubular member and a second section extending beyond the other end of said center tubular member.

8. A flexural pivot device comprised of first and second arcuate elements arranged on a common circle with adjacent axial edges equally spaced, crossed flat springs connecting said arcuate elements and providing an axis of relative rotation for said elements, first means for mounting a rotatable member connected to said first element and being free of any connection to said second element, second means for providing a fixed support connected to said second element and being free of any connection to said first element, the adjacent equally-spaced edges of said elements having an included angle within the range of fifteen to forty-five degrees whereby said first means can be limitedly rotated in relation to said second means as limited by abutment of said edges, said first means being a centrally-located tubular member having its inner surface bonded to the outer surface of said first element, said second means being two end tubular members spaced from each end of said centrally-located member and bonded at their inner surfaces to the outer surface of said second element.

9. A flexural pivot device comprised of first and second arcuate elements arranged on a common circle with adjacent axial edges equally spaced, crossed flat springs connecting said arcuate elements and providing an axis of relative rotation for said elements, first means for mounting a rotatable member connected to said first element and being free of any connection to said second element, second means for providing a fixed support connected to said second element and being free of any connection to said first element, the adjacent equally-spaced edges of said elements having an included angle within the range of fifteen to forty-five degrees whereby said first means can be limitedly rotated in relation to said second means as limited by abutment of said edges, said first means being a tubular mounting member bonded to the outer surface of said first element, said second means being a tubular support member axially-aligned with and spaced from said tubular mounting member, said support member being bonded to the outer surface of said second element.

10. A flexural pivot device comprised of first and second arcuate inner sleeve elements arranged on a common circle with axially-extending edges equally spaced from each other, first and second outer tubular members arranged in axially alignment around said inner sleeve elements, said first inner sleeve element and said first outer tubular member being connected, said second inner sleeve element and said second outer tubular member being connected, said first inner sleeve element being radially spaced from said second outer tubular member, said second inner sleeve element being radially spaced from said first outer tubular member, crossed flat spring means connecting said first and second sleeve elements so that said first tubular member is rotatable when said second tubular member is fixed.

11. A flexural pivot device comprised of first and second cylindrical means arranged on a common axis and axially spaced from each other, said first cylindrical means having an inwardly-projecting arcuate structure, said arcuate structure extending axially into said second cylindrical means and being radially-spaced therefrom, said second cylindrical means having inwardly-projecting arcuate structure diametrical of said arcuate structure of said first cylindrical means, said arcuate structure of said second cylindrical means extending axially into said first cylindrical means and being radially-spaced therefrom, said arcuate structures having axially-extending edges equally spaced from each other, crossed flat spring means connecting said arcuate structures so that said first and second cylindrical means are rotatable relative to each other on said common axis.

References Cited in the file of this patent

UNITED STATES PATENTS

| | | |
|---|---|---|
| 2,480,114 | Bradbury | Aug. 30, 1949 |
| 2,735,731 | Freebairn et al. | Feb. 21, 1956 |
| 2,757,050 | Weber et al. | July 31, 1956 |
| 2,931,092 | Humphrey | Apr. 5, 1960 |